US012766745B2

(12) United States Patent
Kim et al.

(10) Patent No.: US 12,766,745 B2
(45) Date of Patent: Oct. 20, 2026

(54) MATERIAL TRANSPORT HAND, MATERIAL TRANSPORT DEVICE, AND MATERIAL TRANSPORT METHOD

(71) Applicant: HANWHA ROBOTICS CORPORATION, Seongnam-si (KR)

(72) Inventors: Kwang Il Kim, Seoul (KR); Ji Hwan Roh, Seoul (KR); Tae Gyeong Kim, Seoul (KR)

(73) Assignee: HANWHA ROBOTICS CORPORATION, Seongnam-si (KR)

( * ) Notice: Subject to any disclaimer, the term of this patent is extended or adjusted under 35 U.S.C. 154(b) by 556 days.

(21) Appl. No.: 18/124,257

(22) Filed: Mar. 21, 2023

(65) Prior Publication Data

US 2023/0219241 A1 Jul. 13, 2023

Related U.S. Application Data

(63) Continuation of application No. PCT/KR2022/006617, filed on May 10, 2022.

(30) Foreign Application Priority Data

Dec. 30, 2021 (KR) ........................ 10-2021-0193418

(51) Int. Cl.
*B25J 15/08* (2006.01)
*B25J 9/10* (2006.01)
(Continued)

(52) U.S. Cl.
CPC ............... *B25J 15/08* (2013.01); *B25J 9/104* (2013.01); *B25J 9/126* (2013.01); *B25J 9/1692* (2013.01)

(58) Field of Classification Search
CPC ... B25J 15/08; B25J 5/007; B25J 9/104; B25J 9/126; B25J 9/1692; B66F 9/184;
(Continued)

(56) References Cited

U.S. PATENT DOCUMENTS

2011/0187140 A1* 8/2011 Hashimoto .............. B25J 15/00
2011/0280691 A1* 11/2011 Yabe ................. H01L 21/67745
(Continued)

FOREIGN PATENT DOCUMENTS

CN 107520187 A * 12/2017 ............. B08B 13/00
JP 7-206228 A 8/1995
(Continued)

OTHER PUBLICATIONS

Machine Translation of KR-200438238-Y1;"Reel Loader" (Year: 2008).*
(Continued)

*Primary Examiner* — Ellis B. Ramirez
(74) *Attorney, Agent, or Firm* — Sughrue Mion, PLLC

(57) ABSTRACT

A transfer hand of a material transport device for receiving a material from a counterpart device or delivering the material to the counterpart device includes a hand main body, a hand driving motor disposed on one side of the hand main body, a guide configured to move according to the hand driving motor, a pusher disposed on one side of the guide and configured to press the material, and a clamp disposed on the other side of the hand main body and configured to maintain a position of the material, wherein, when the hand driving motor operates, the guide is configured to move, and the pusher and the clamp are configured to interoperate.

20 Claims, 14 Drawing Sheets

(51) Int. Cl.
*B25J 9/12* (2006.01)
*B25J 9/16* (2006.01)

(58) Field of Classification Search
CPC .... B66F 9/063; B66F 9/16; B66F 9/24; B66F 2700/09; B65H 19/123
USPC ..... 700/254; 414/467, 477, 478, 22.57, 279; 901/1, 48, 32
See application file for complete search history.

(56) References Cited

U.S. PATENT DOCUMENTS

| | | | | |
|---|---|---|---|---|
| 2016/0096690 | A1* | 4/2016 | Matsunari | B25J 9/0087 |
| 2016/0288322 | A1* | 10/2016 | Lin | B25J 9/163 |
| 2018/0002126 | A1* | 1/2018 | Gonzales | B66F 9/063 |
| 2019/0352092 | A1* | 11/2019 | Zheng | B65G 1/1375 |
| 2020/0354167 | A1 | 11/2020 | Koenig et al. | |
| 2021/0339393 | A1* | 11/2021 | Dan | B25J 5/007 |

FOREIGN PATENT DOCUMENTS

| | | | | |
|---|---|---|---|---|
| JP | 2000-103548 | A | | 4/2000 |
| JP | 2015074530 | A | * | 4/2015 |
| KR | 20060049255 | A | * | 5/2006 |
| KR | 200438238 | Y1 | * | 2/2008 |
| KR | 10-2017-0137656 | A | | 12/2017 |
| KR | 10-1906793 | B1 | | 10/2018 |
| KR | 10-2193483 | B1 | | 12/2020 |
| KR | 10-2325380 | B1 | | 11/2021 |

OTHER PUBLICATIONS

International Search Report & Written Opinion (PCT/ISA/210 & 237) issued Mar. 31, 2023 from the International Searching Authority in International Application No. PCT/KR2022/006617.

European Extended Search Report issued Sep. 25, 2024 by the European Patent Office for EP Patent Application No. 22868420.5.

* cited by examiner

MATERIAL TRANSPORT HAND, MATERIAL TRANSPORT DEVICE, AND MATERIAL TRANSPORT METHOD

CROSS-REFERENCE TO RELATED APPLICATION(S)

This application is a bypass continuation of International Application No. PCT/KR2022/006617, filed on May 10, 2022, in the Korean Intellectual Property Receiving Office, which is based on and claims priority to Korean Patent Application No. 10-2021-0193418, filed on Dec. 30, 2021, in the Korean Intellectual Property Office, the disclosures of which are incorporated herein by reference in their entireties.

TECHNICAL FIELD

The present disclosure relates to a material transport hand, a material transport device, and a material transport method.

BACKGROUND ART

In transporting and loading secondary battery electrode plates, paper, or steel plates wound in a circular core shape, such as a roll or a reel, conventionally, a pneumatic shaft is used to spray and adhere air to surface pressure.

However, since such a structure needs to have an air tank or an air compressor in order to use air, it is suitable for stationary equipment but is not suitable for installation on a moving body, such as a transfer cart.

The above-described background art is technical information that the inventor possessed for derivation of the present disclosure or acquired during the derivation process of the present disclosure, and may not be necessarily known art disclosed to the general public prior to filing the present disclosure.

DISCLOSURE

Technical Problem

The present disclosure is for solving the above-mentioned problem, and relates to a material transport hand having a stopper, a clamp, a pusher, and a guide function to safely and accurately transport a material, and a material transport device including the material transport device.

However, the problem is an example, and the problem to be solved by the present disclosure is not limited thereto.

Technical Solution

A transfer hand for receiving a material from a counterpart device or delivering the material to the counterpart device according to an embodiment of the present disclosure includes a hand main body, a hand driving motor disposed on one side of the hand main body, a guide moving according to the hand driving motor, a pusher disposed on one side of the guide and pressing the material, and a clamp disposed on the other side of the hand main body and maintaining a position of the material, and when the hand driving motor operates, the guide moves, and the pusher and the clamp interoperate.

When the guide moves forward, the pusher may move forward and press the material loaded on the hand main body and unload the material, and when the guide moves backward, the pusher may move backward and form a space in which the material is loaded from the counterpart device.

The clamp may include a front clamp disposed at a front end of the hand main body, protruding outward from the hand main body when the pusher moves backward, and drawn into the hand main body when the pusher moves forward.

The clamp may further include a clamp base disposed on one side of the hand main body, a first elastic member connected to the clamp base, and a stopper connected to the guide, when the material is loaded, as the pusher moves backward, the clamp base may move, and the first elastic member may extend so that the stopper may rotate in one direction and protrude upward from the hand main body, and when the material is unloaded, as the pusher moves forward, the clamp base may move, and the first elastic member may be restored so that the stopper may be drawn into the hand main body.

The clamp may include one or more inside clamps disposed on a side surface of the hand main body, protruding from the outer surface of the hand main body when the guide moves backward, and drawn into an inner surface of the hand main body when the guide moves forward.

The one or more inside clamps may include a follower connected to the guide, a clamp inclined surface in contact with the follower, a clamp pad disposed outside the hand main body, and one or more second elastic members disposed between the clamp inclined surface and the clamp pad, when the material is loaded, as the guide moves backward, the follower may be drawn along the clamp inclined surface and press the second elastic member so that the clamp pad may protrude outward from the hand main body, and when the material is unloaded, as the guide moves forward, the follower may be drawn along the clamp inclined surface, and the one or more second elastic members may be restored so that the clamp pad may be drawn into the hand main body.

The transfer hand may further include one or more rollers disposed outside the hand main body, contacting an inner surface of the material, and guiding a movement of the material.

The transfer hand may further include a tilting motor disposed on one side of the hand main body and adjusting an inclination of the hand main body.

The tilting motor may include a tilting motor operating independently of the hand driving motor and one or more tilting mechanisms interoperating with the tilting motor, when the material is loaded, the tilting motor may operate to rotate the hand main body upward, and when the material is unloaded, the tilting motor may operate to rotate the hand main body downward.

The transfer hand may further include a hand sensor including a plurality of sensors disposed inside and outside of the hand main body in a longitudinal direction, and the hand sensor may determine that an unloading operation is completed if the sensor disposed outside detects the material when the material is unloaded, and determine that a loading operation is completed if the sensor disposed outside detects the material delivered from the counter device when the material is loaded.

A material transport method of receiving a material from a counterpart device or delivering the material to the counterpart device using a transfer hand according to an embodiment of the present disclosure includes loading the material by operating a hand driving motor, moving a pusher backward, and maintaining a position of the material with a clamp, by the transfer hand; and unloading the material from the counterpart device by moving the pusher and pressing the material, by the hand driving motor.

The loading of the material may include rotating a front clamp disposed at a front end upward as the pusher moves backward, and the unloading of the material may include drawing the front clamp inward as the pusher moves forward.

The loading of the material may include pressing the material by protruding an inside clamp disposed on a side surface outward as the pusher moves backward, and the unloading of the material may include drawing the inside clamp inward as the pusher moves forward.

A movement of the pusher and an operation of the clamp may be performed simultaneously.

The loading of the material may include moving the pusher backward when one or more sensors disposed in front of a hand sensor detect the material, and the unloading of the material may include determining that the unloading is completed when one or more sensors disposed in a rear of the hand sensor detect the material as the pusher presses the material.

The material transport method may further include, before the loading of the material, determining, by the transfer hand, a position of the counterpart device, and calibrating, by a tilting motor, a tilting angle of the transfer hand based on the determined position.

The material transport method may further include tilting the transfer hand upward by a certain angle by a tilting motor after the loading of the material.

A material transport device includes a transfer hand for receiving a material from a counterpart device or delivering the material to the counterpart device according an embodiment of the present disclosure, wherein the transfer hand includes a hand main body, a hand driving motor disposed on one side of the hand main body, a guide moving according to the hand driving motor, a pusher disposed on one side of the guide and pressing the material, and a clamp disposed on the other side of the hand main body and maintaining a position of the material, when the pusher moves forward, the clamp is released and the pusher presses the material loaded on the hand main body so that the material is unloaded, and when the pusher moves backward, the pusher forms a space in which the material is loaded from the counterpart device, and the clamp maintains a position of the material.

The clamp may include a front clamp disposed at a front end of the hand main body, rotating according to an operation of the pusher, and preventing the material from being separated from the hand main body, and an inside clamp disposed on a side surface of the hand main body, protruding outward or drawn inward according to the operation of the pusher, and fixing the position of the material.

The material transport device may further include a hand sensor including a plurality of sensors of the hand main body disposed in a longitudinal direction, when the material is loaded on the counterpart device, if the hand sensor detects the material, the pusher may move backward, the front clamp may rotate upward, and the inside clamp may press an inner surface of the material, and when the material is unloaded from the counterpart device, as the pusher moves forward, the front clamp may rotate downward and the inside clamp may be drawn into the hand main body.

Other aspects, features, and advantages other than those described above will become clear from the detailed description, the claims, and the drawings for carrying out the invention below.

Advantageous Effects

According to the present disclosure, both the operation of loading and unloading the material and the operation of fixing the position of the material with the clamp may be performed by the operation of one driving.

According to the present disclosure, the material may be transported accurately and safely through the interoperation of the clamp and the hand sensor.

BEST MODE

Figure 1:
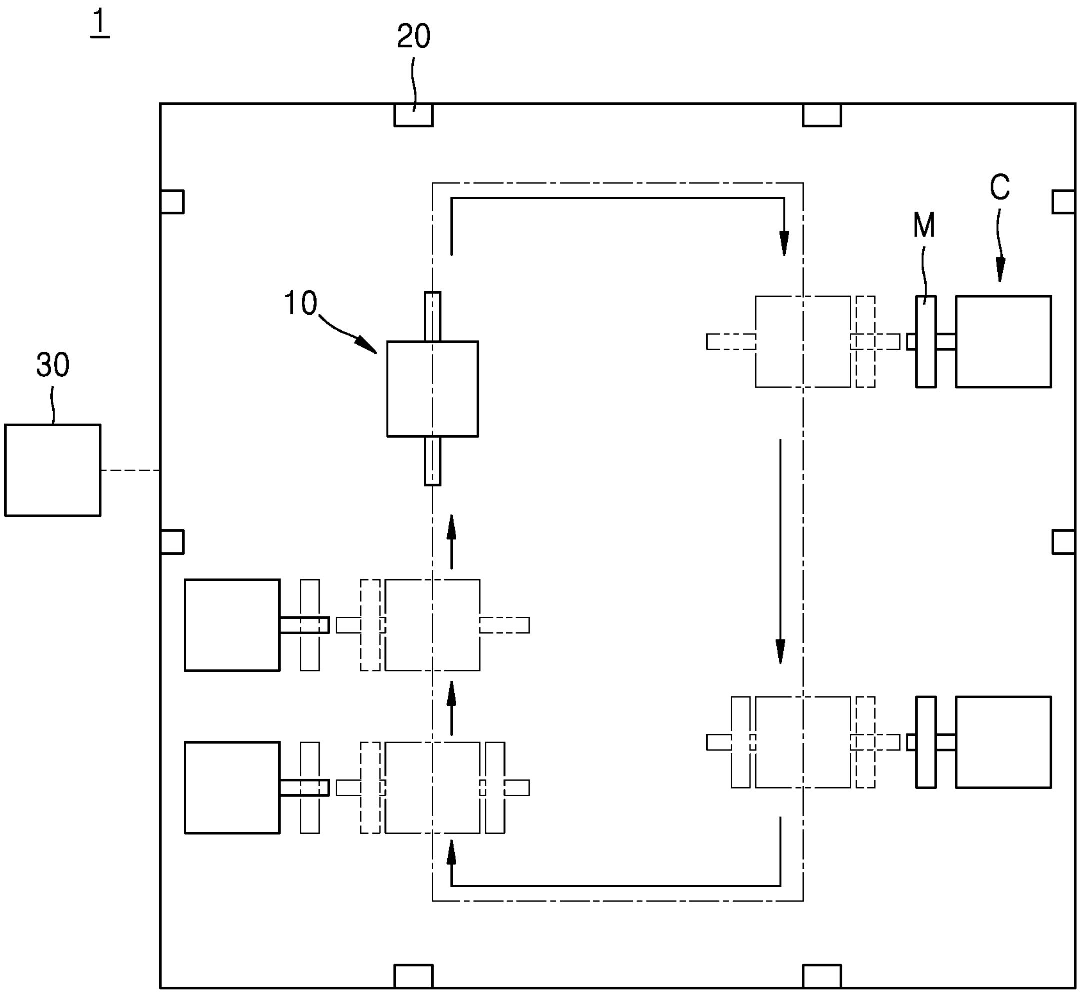
FIG. 1 shows a material transport device according to an embodiment of the present disclosure.

A transfer hand for receiving a material from a counterpart device or delivering the material to the counterpart device according to an embodiment of the present disclosure includes a hand main body, a hand driving motor disposed on one side of the hand main body, a guide moving according to the hand driving motor, a pusher disposed on one side of the guide and pressing the material, and a clamp disposed on the other side of the hand main body and maintaining a position of the material, and when the hand driving motor operates, the guide moves, and the pusher and the clamp interoperate.

MODE FOR INVENTION

The present disclosure may have various modifications and various embodiments, and specific embodiments are illustrated in the drawings and are described in detail in the detailed description. However, this is not intended to limit the present disclosure to particular embodiments, and it will be understood that all changes, equivalents, and substitutes that do not depart from the spirit and technical scope of the present disclosure are encompassed in the present disclosure. In the description of the present disclosure, even though elements are illustrated in other embodiments, like reference numerals are used to refer to like elements.

Hereinafter, embodiments of the present disclosure will be described in detail with reference to the accompanying drawings, and in the following description with reference to the drawings, like reference numerals refer to like elements and redundant descriptions thereof will be omitted.

Although the terms “first,” “second,” etc. may be used to describe various elements, these elements should not be limited by these terms. These terms are only used to distinguish one element from another.

An expression used in the singular encompasses the expression of the plural, unless it has a clearly different meaning in the context.

It will be understood that the terms "comprise," "comprising," "include" and/or "including" as used herein specify the presence of stated features or elements but do not preclude the addition of one or more other features or elements.

Sizes of elements in the drawings may be exaggerated or reduced for convenience of explanation. In other words, because sizes and thicknesses of elements in the drawings are arbitrarily illustrated for convenience of explanation, the present disclosure is not necessarily limited thereto.

The x-axis, the y-axis and the z-axis are not limited to three axes of the rectangular coordinate system, and may be interpreted in a broader sense. For example, the x axis, the y axis, and the z axis may be perpendicular to one another or may represent different directions that are not perpendicular to one another.

In the case where a certain embodiment may be implemented differently, a specific process order may be performed in the order different from the described order. As an example, two processes that are successively described may be substantially simultaneously performed or performed in the order opposite to the order described.

The terms used herein are only used to describe particular embodiments and are not intended to limit the scope of the present disclosure. It will be understood that the terms "comprise," "comprising," "include" and/or "including" as used herein specify the presence of stated features, numbers, steps, operations, elements, parts, and combinations thereof, but do not preclude in advance the presence or addition of one or more other features, numbers, steps, operations, elements, parts, combinations thereof.

Figure 2:
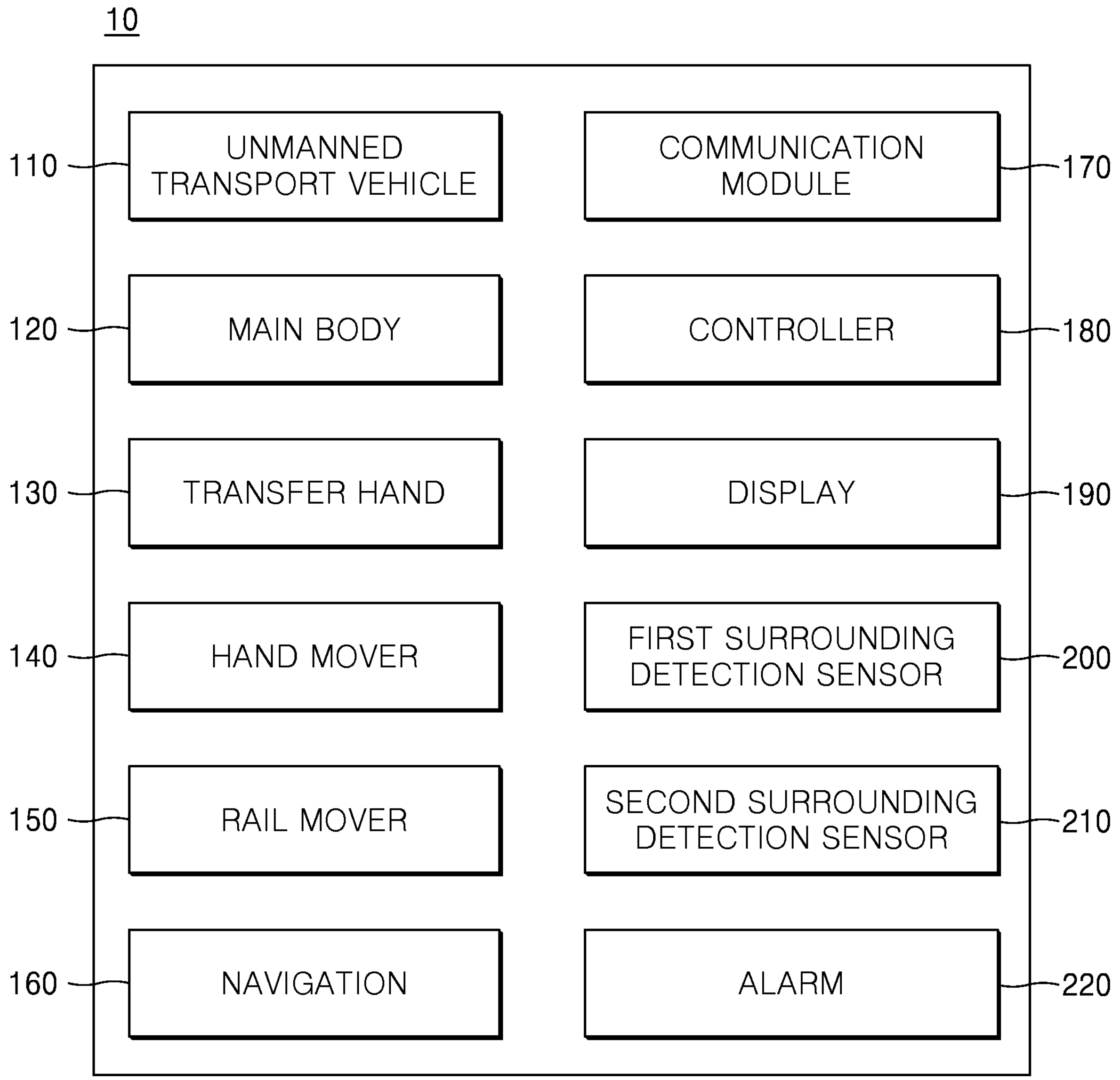
FIG. 2 schematically shows the configuration of the material transport device according to an embodiment of the present disclosure.
Figure 3:
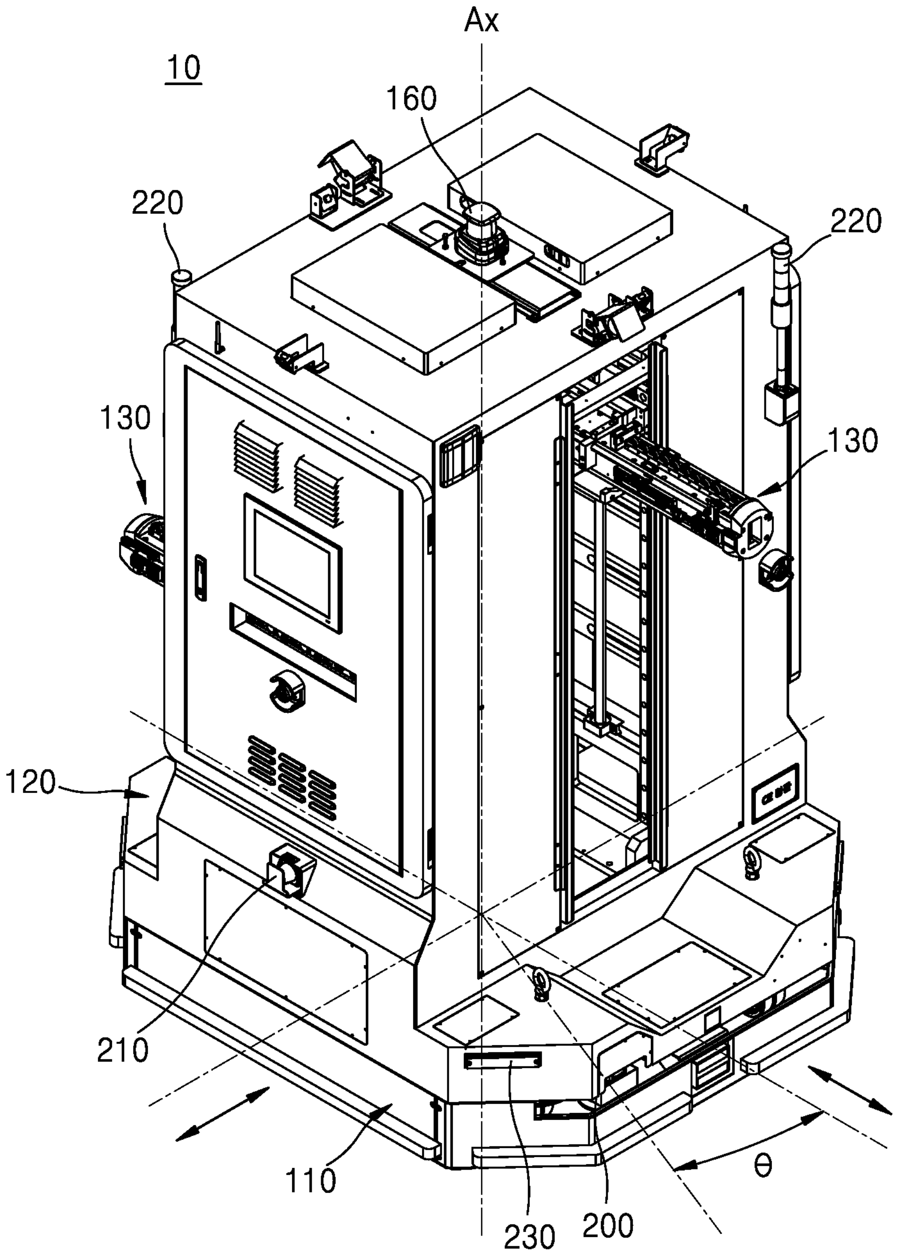
FIG. 3 shows a perspective view of the material transport device according to an embodiment of the present disclosure.
Figure 4:
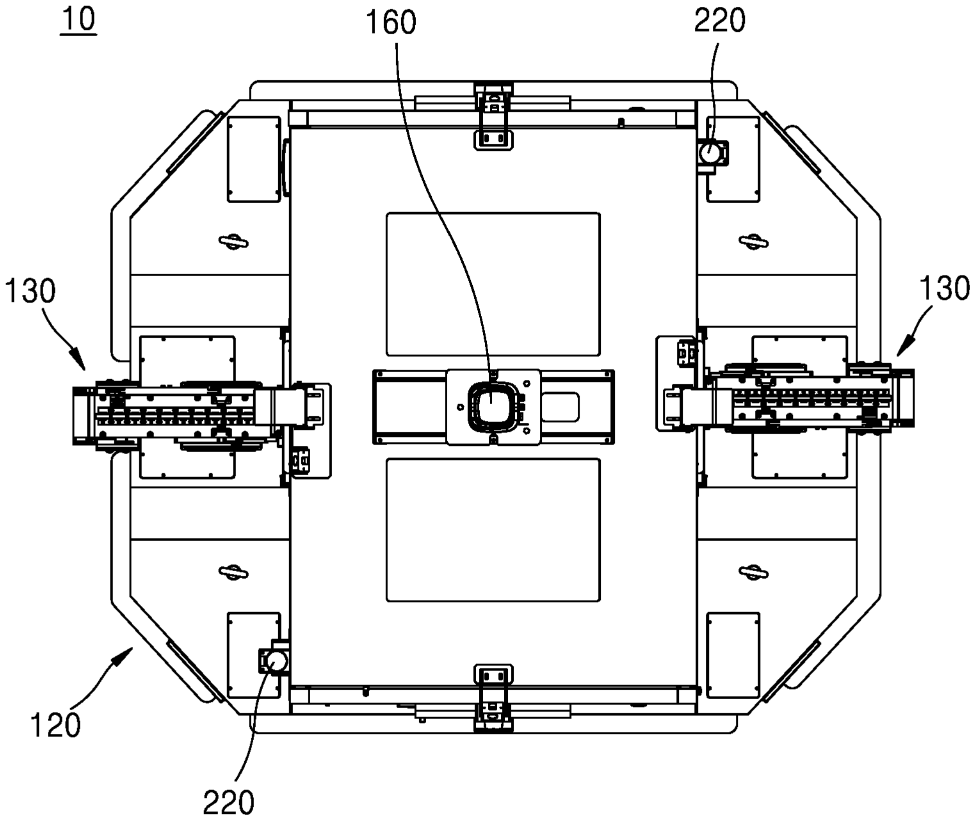
FIG. 4 shows a plan view of the material transport device according to an embodiment of the present disclosure.
Figure 5:
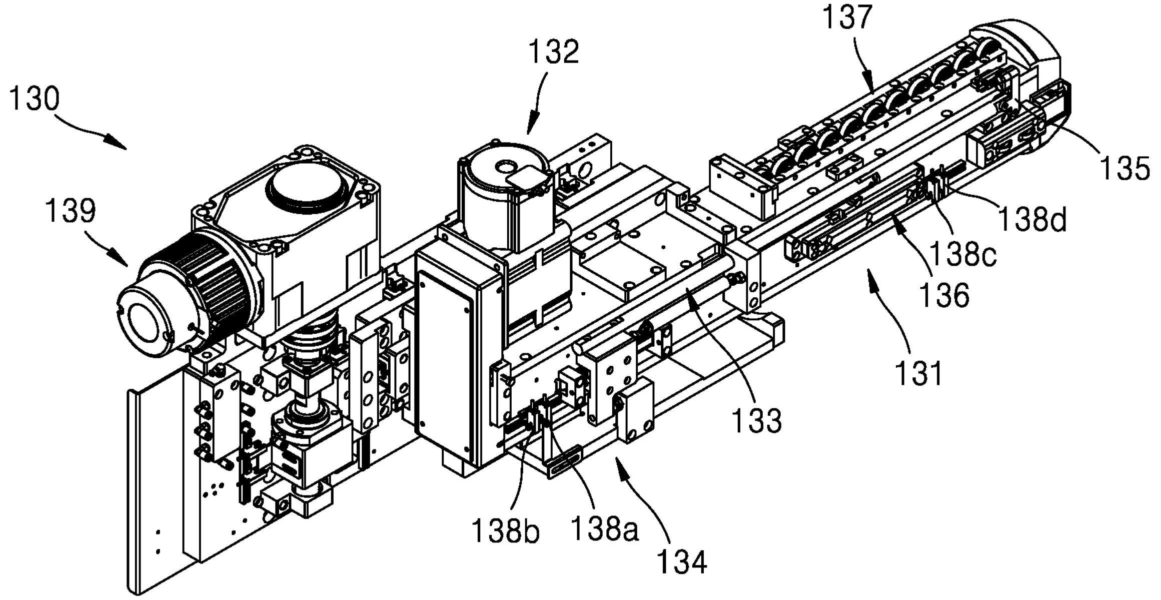
FIGS. 5 and 6 show a transfer hand according to an embodiment of the present disclosure.
Figure 6:
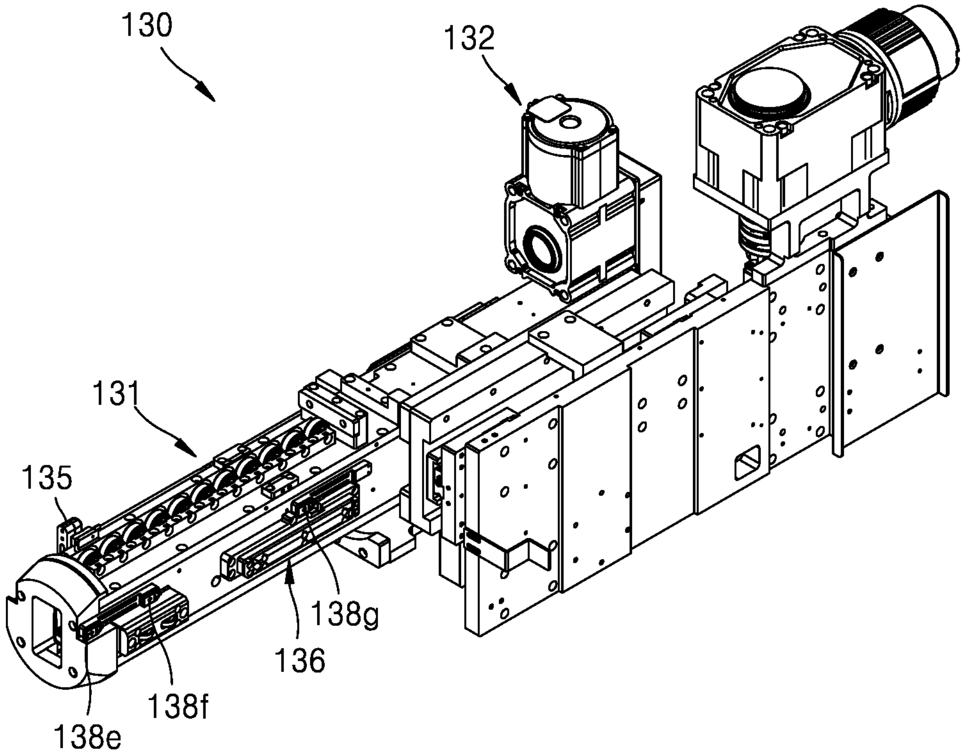
Figure 7:
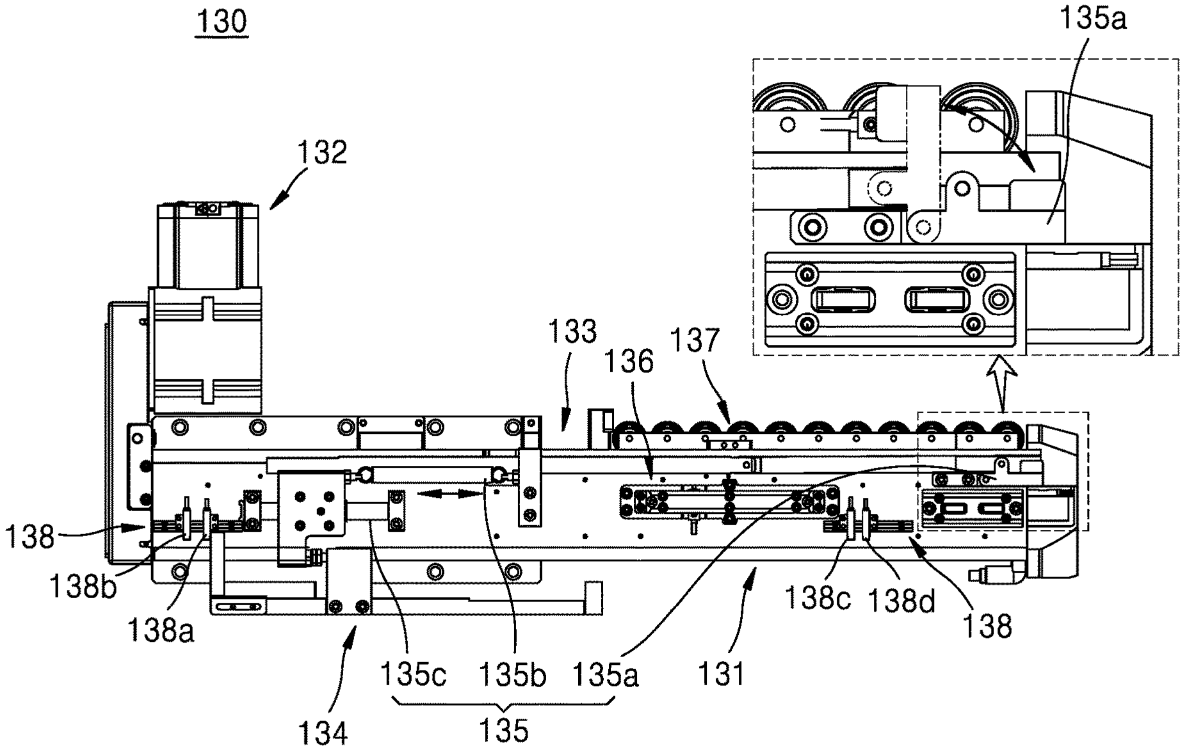
FIGS. 7 and 8 show a state where the transfer hand loads a material according to an embodiment of the present disclosure.
Figure 8:
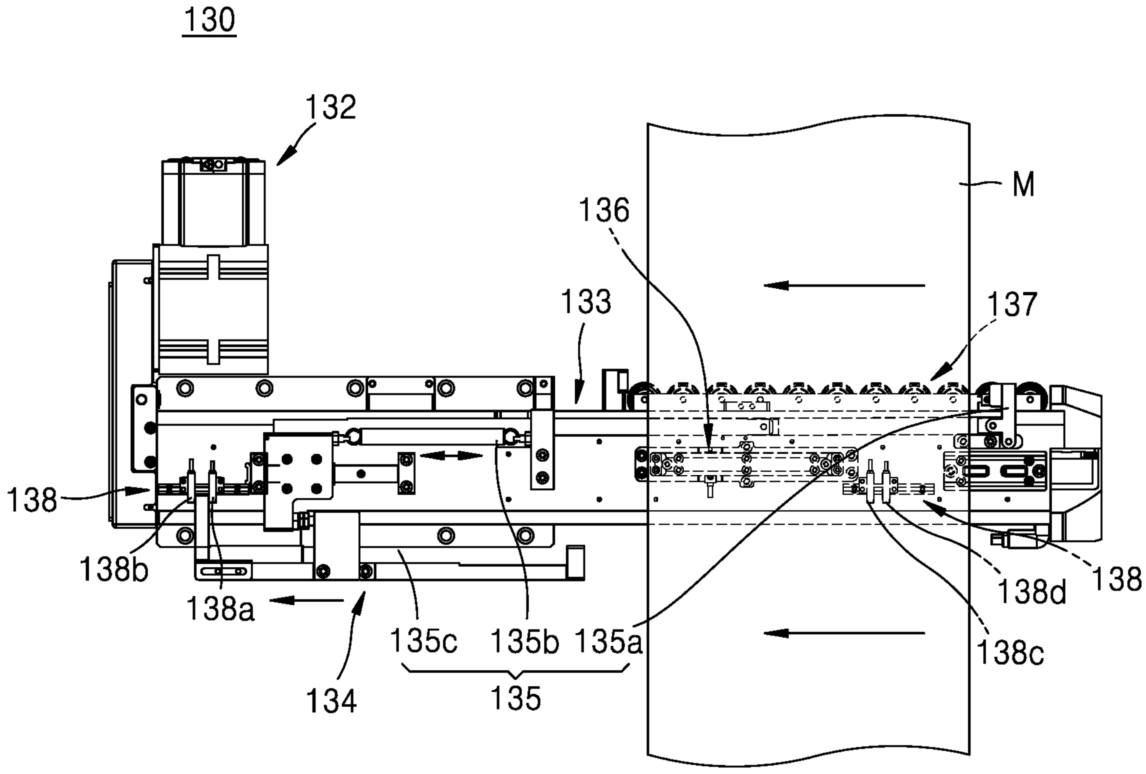
Figure 9:
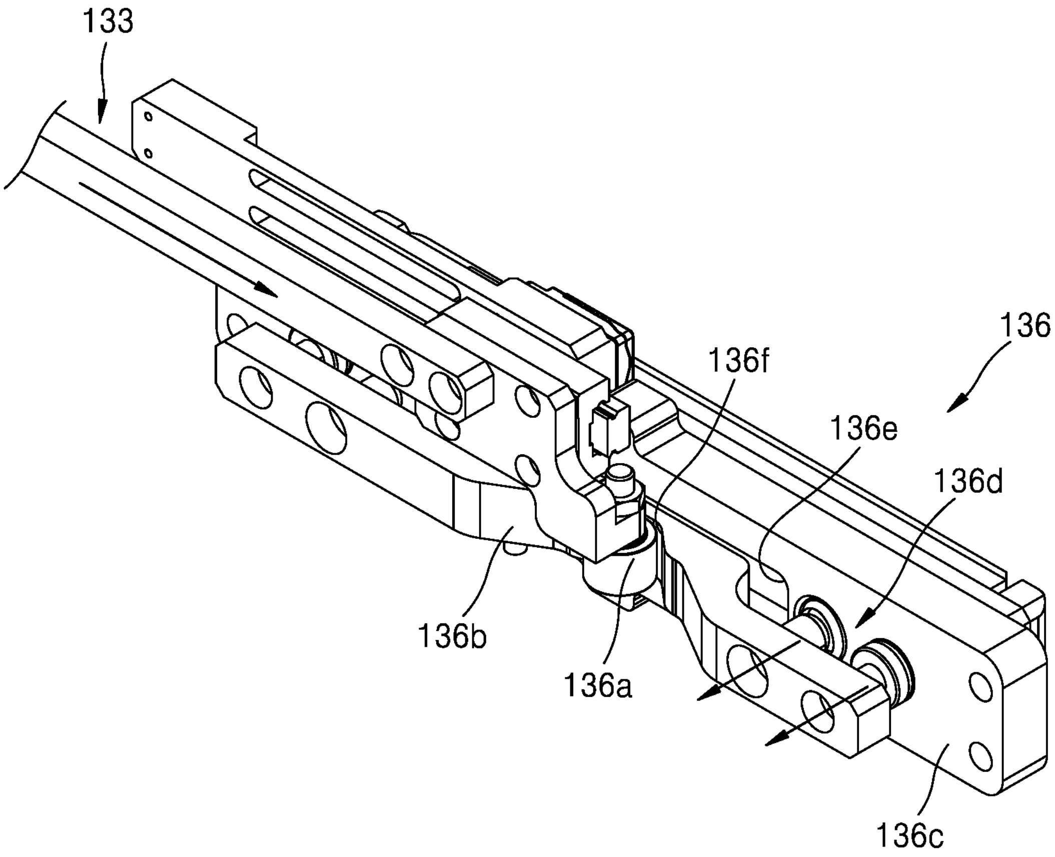
FIGS. 9 and 10 show an inside clamp according to an embodiment of the present disclosure.
Figure 10:
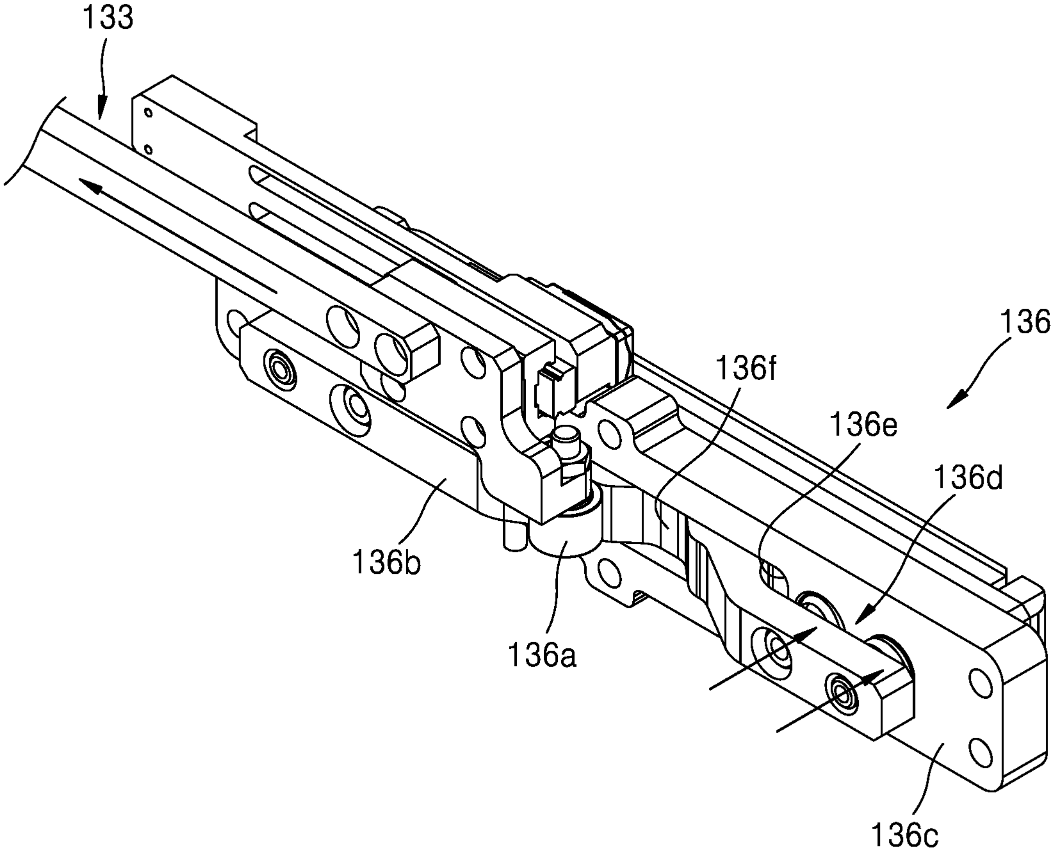
Figure 11:
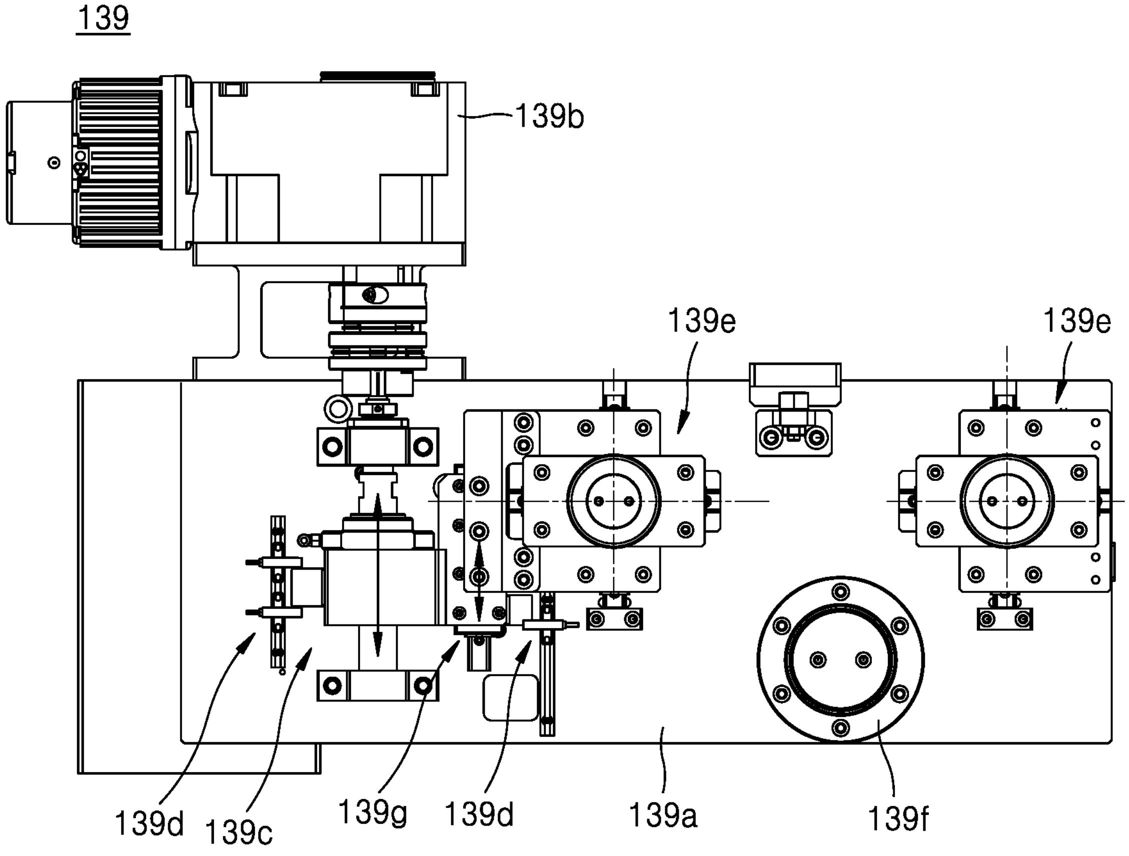
FIGS. 11 and 12 show a tilting motor according to an embodiment of the present disclosure.
Figure 12:
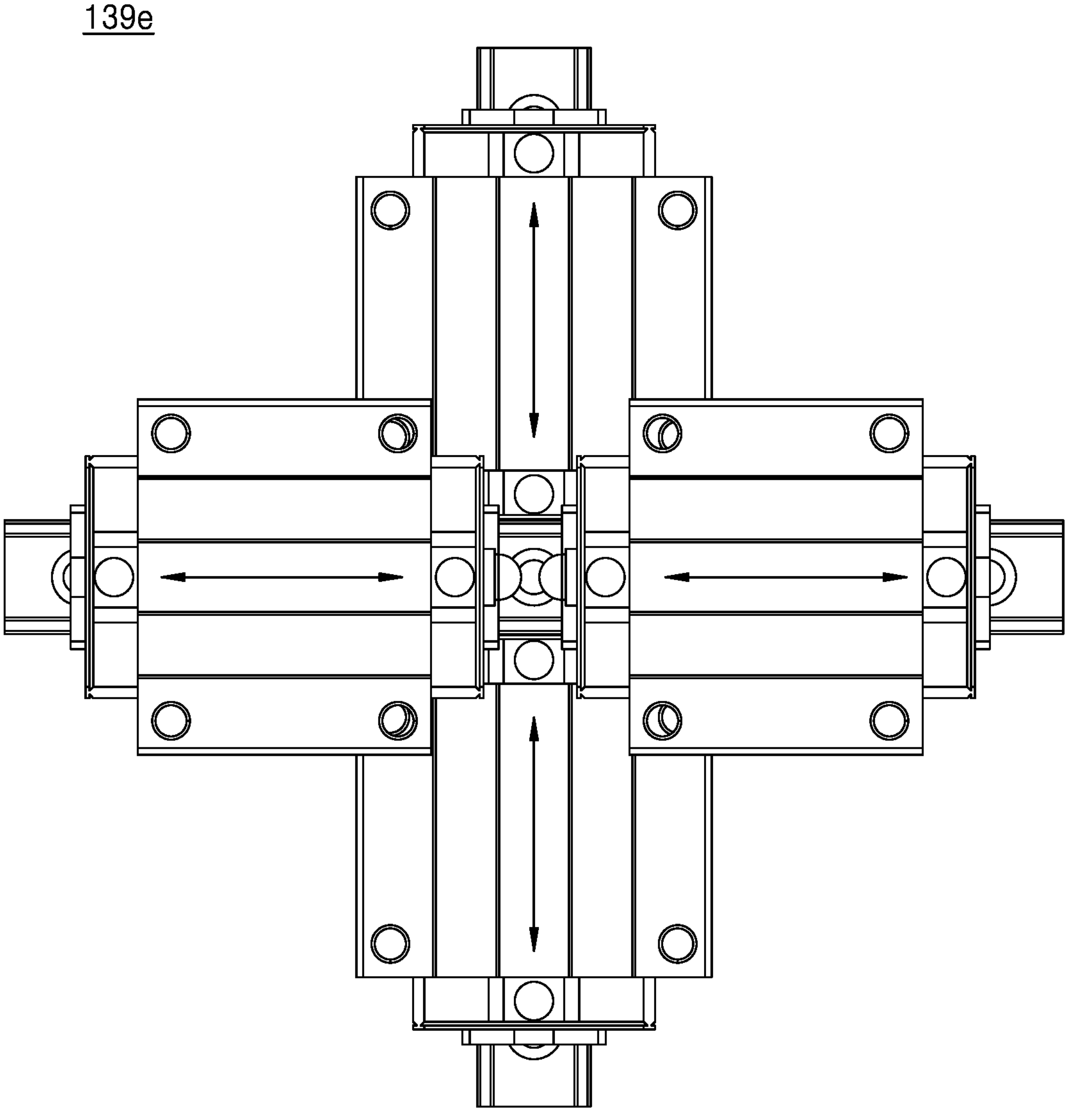
Figure 13:
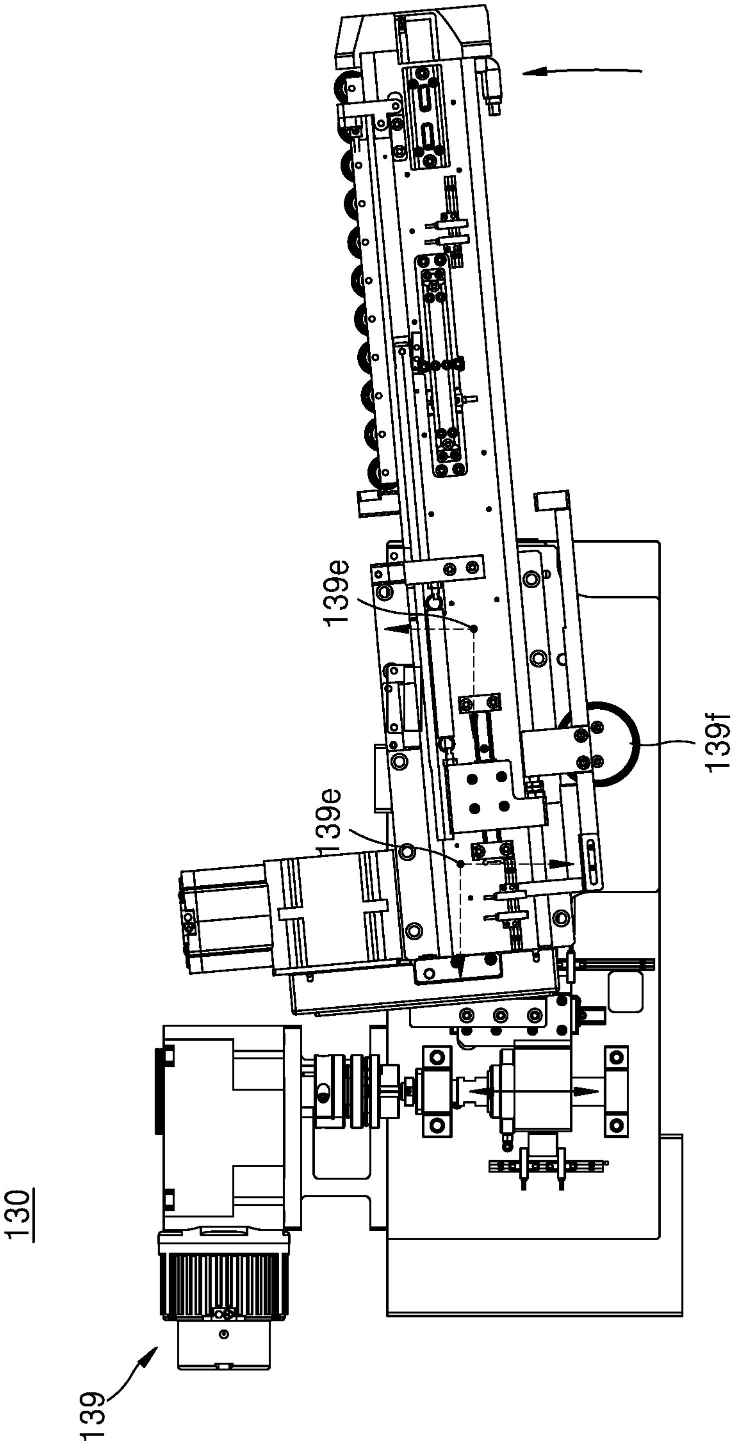
FIGS. 13 and 14 show the operation of the tilting motor according to an embodiment of the present disclosure.
Figure 14:
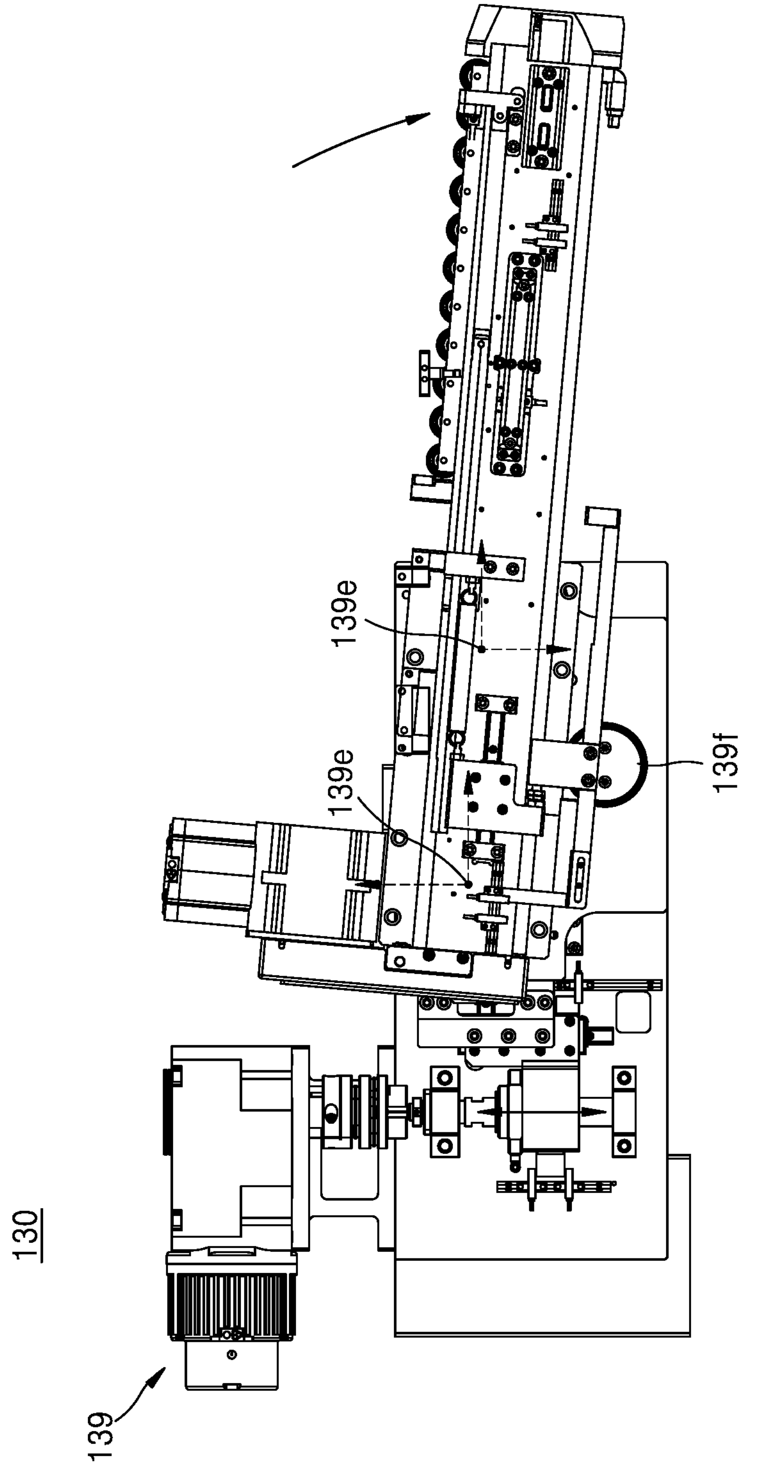

FIG. 1 shows a material transport system 1 including a material transport device 10 according to an embodiment of the present disclosure. FIG. 2 schematically shows the configuration of the material transport device 10 according to an embodiment of the present disclosure. FIG. 3 shows a perspective view of the material transport device 10 according to an embodiment of the present disclosure. FIG. 4 shows a plan view of the material transport device 10 according to an embodiment of the present disclosure. FIGS. 5 and 6 show a transfer hand 130 according to an embodiment of the present disclosure. FIGS. 7 and 8 show a state where the transfer hand 130 loads a material M according to an embodiment of the present disclosure. FIGS. 9 and 10 show an inside clamp 136 according to an embodiment of the present disclosure. FIGS. 11 and 12 show a tilting motor 139 according to an embodiment of the present disclosure. FIGS. 13 and 14 show the operation of the tilting motor 139 according to an embodiment of the present disclosure.

Referring to FIGS. 1 to 14, the material transport device 10 according to an embodiment of the present disclosure may be used to transport the material M. The type of the material M is not particularly limited, and may be a reel or a roll wound in a cylindrical core shape. For example, the material M may be a steel plate, paper, or an electrode plate for a secondary battery. Also, the material M may have a shape other than a cylindrical shape. Hereinafter, for convenience of description, a case in which the material M has an annular shape is mainly described.

Referring to FIG. 1, the material transport device 10 according to an embodiment of the present disclosure may move the material M to a counterpart device C from a work area. For example, in a state where the material transport device 10 does not initially hold the material M, the material transport device 10 moves to the first counterpart device C along a set path. When the material transport device 10 arrives at the counterpart device C and calibrates its position, the material transport device 10 receives the material M from the counterpart device C. Similarly, the material transport device 10 moves to another counterpart device C and receives the material M again. Thereafter, when the material transport device 10 moves along the set path and arrives at the counterpart device C, the material transport device 10 may deliver the loaded material M to the counterpart device C and return to its original position.

In an embodiment, the material transport device 10 may be included in the material transport system 1. The material transport system 1 may include the material transport device 10, a position recognition sensor 20, and a server 30. One or more position recognition sensors 20 are disposed in the work area where the material transport device 10 operates. The position recognition sensor 20 sends a signal to the material transport device 10 to determine its position in real time. For example, when the position recognition sensor 20, which is a laser irradiation device, irradiates a laser to the material transport device 10, a navigation 160 of the material transport device 10 receives the laser and detects the position of the material transport device 10.

The server 30 transmits and receives data through a communication module 170 of the material transport device 10. For example, a user may control a moving path and speed of the material transport device 10 through the server 30. In addition, when the material transport device 10 deviates from a preset path, the material transport device 10 may notify this to the server 30, and the user may reset a movement path of the material transport device 10 through the server 30.

Referring to FIGS. 2 to 4, the material transport device 10 according to an embodiment of the present disclosure may include an unmanned transport vehicle 110, a main body 120, a transfer hand 130, a hand mover 140, a rail mover 150, a navigation 160, the communication module 170, a controller 180, a display 190, a first surrounding detection sensor 200, a second surrounding detection sensor 210, and an alarm 220.

The unmanned transport vehicle 110 is a cart for moving the material transport device 10 and may be an automated guided vehicle (AGV). As shown in FIG. 3, the unmanned transport vehicle 110 may be disposed below the material transport device 10 and may move through a mover (not shown) such as wheels disposed inside.

In an embodiment, the unmanned transport vehicle 110 may perform linear motion and rotational motion. For example, the unmanned transport vehicle 110 may rotate in a horizontal direction with respect to a central axis Ax.

The main body 120 is disposed on the upper surface of the unmanned transport vehicle 110 and supports other components of the material transport device 10. For example, the main body 120 has an inner space, and other components of the material transport device 10 may be disposed inside or outside the main body 120.

The transfer hand 130 is disposed on one side of the unmanned transport vehicle 110 and directly transports the material M. For example, a total of two transfer hands 130 may be one each disposed on one side and the other side of the main body 120. In addition, the transfer hands 130 may be disposed on one surface of the main body 120 and on the other surface opposite thereto, so as to face each other with respect to the central axis Ax. However, the number and arrangement of the transfer hands 130 are not particularly limited. For example, one or more transfer hands 130 may be disposed, and when a plurality of transfer hands 130 are provided, the plurality of transfer hands 130 may be disposed on adjacent side surfaces among a plurality of side surfaces of the main body 120, respectively. Hereinafter, for convenience of description, a case in which the transfer hands 130 are one each disposed on two side surfaces of the main body 120 facing each other is mainly described.

In an embodiment, at least a part of the transfer hand 130 may be disposed inside the main body 120 and the remaining part thereof may be disposed outside the main body 120. The material M delivered from the counterpart device C is loaded on an outwardly protruding part of the transfer hand 130. In addition, the material M may be unloaded to the counterpart device C through the protruding part. Here, loading means a state where the material M is delivered to the material transport device 10, that is, the transfer hand 130, and unloading means a state where the material M is separated from the material transport device 10, that is, the transfer hand 130.

In an embodiment, the transfer hand 130 may move up and down by the hand mover 140 while being disposed on the main body 120 and adjust its height with the counterpart device C. In addition, the transfer hand 130 may adjust its height and angle with the counterpart device C through a tilting motor 139 to be described below.

In an embodiment, the plurality of transfer hands 130 may operate independently of each other. For example, as shown in FIGS. 3 and 4, when two transfer hands 130 are disposed, even if one transfer hand 130 moves in the vertical direction, the other transfer hand 130 may not move.

In an embodiment, the transfer hand 130 may include a hand main body 131, a hand driving motor 132, a guide 133, a pusher 134, a clamp (a front clamp 135 and an inside clamp 136), a guide roller 137, a hand sensor 138, and the tilting motor 139.

The hand main body 131 may hold and support other components of the transfer hand 130. The hand main body 131 may extend in a longitudinal direction of the transfer hand 130 and may have a rectangular parallelepiped shape having an internal space ora shape similar thereto. Also, the hand main body 131 may support the loaded material M.

Although not shown in the drawing, a positioning sensor (not shown) may be disposed at the front end of the hand main body 131 to determine whether the position of the material transport device 10 corresponds to that of the counterpart device C. The positioning sensor may recognize a marker (not shown) disposed on one side of the counterpart device C, and may confirm whether the transfer hand 130 is in an appropriate position for loading or unloading the material M.

The hand driving motor 132 is disposed on one side of the hand main body 131 to operate the transfer hand 130. For example, the hand driving motor 132 may operate the guide 133, the pusher 134, the front clamp 135, and the inside clamp 136 to be described below.

The guide 133 may be disposed inside and/or outside the hand main body 131 and may operate in conjunction with the hand driving motor 132. For example, the guide 133 may convert the rotational motion of the hand driving motor 132 into linear motion and may move in the longitudinal direction of the hand main body 131.

In an embodiment, the guide 133 may be connected to the pusher 134, the front clamp 135 and the inside clamp 136. Accordingly, three members (the pusher 134, the front clamp 135, and the inside clamp 136) of the transfer hand 130 may operate by the operation of one driving, that is, the hand driving motor 132.

In an embodiment, the guide 133 may be any one member or may include a plurality of members. For example, the guide 133 may include a device that converts the motion of the hand driving motor 132 into linear motion and a linear guide connected therewith. More specifically, as shown in FIG. 5, the guide 133 may include a rod extending in the longitudinal direction of the transfer hand 130 and a slider disposed inside the hand main body 131.

The pusher 134 is disposed on one side of the guide 133 and moves according to the operation of the hand driving motor 132. For example, when the hand driving motor 132 rotates in one direction, the guide 133 moves forward, and the pusher 134 connected thereto pushes the loaded material M forward while moving forward as well. In addition, when the material M is not loaded on the transfer hand 130, the guide 133 moves backward if the hand driving motor 132 rotates to receive the material M from the counterpart device C. Then, while the pusher 134 moves backward, a space in which the material M is loaded is formed.

In an embodiment, the pusher 134 may be disposed below the hand main body 131, and one side thereof may be connected to the guide 133. The pusher 134 extends in the longitudinal direction of the transfer hand 130, and the front end thereof comes into contact with the side surface of the material M according to the operation of the hand driving motor 132.

The clamp may be disposed on one side of the hand main body 131 to maintain the position of the material M loaded on the transfer hand 130. For example, when the material M is loaded on the hand main body 131, the clamp may be disposed at the front end of the hand main body 131 so that the material M does not move forward and may prevent the material M from being separated. Alternatively, when the material M is loaded on the hand main body 131, the clamp may be disposed on the outside of the hand main body 131 so as to fix the position of the material M and may press the inner surface of the material M.

In an embodiment, the clamp may include the front clamp 135 and the inside clamp 136.

The front clamp 135 may be disposed on one side of the front end of the hand main body 131 and may be connected to the guide 133. For example, as shown in FIG. 7, the guide 133 may move forward in a state where the material M is not loaded on the transfer hand 130. Accordingly, the pusher 134 may also move forward, and the front clamp 135 connected to the guide 133 may be drawn into the hand main body 131 and may not protrude upward.

And, as shown in FIG. 8, when the material M is loaded on the transfer hand 130 and reaches a preset position, the guide 133 and the pusher 134 move backward to form a space in which the material M is loaded. In addition, according to the movement of the guide 133, the front clamp 135 may rotate upward and protrude to restrict the movement of the transfer hand 130 so that the material M is not separated from the transfer hand 130.

In an embodiment, the front clamp 135 may include a clamp base 135*a*, a first elastic member 135*b*, and a stopper 135*c*.

The clamp base 135*a* may be disposed on one side of the hand main body 131 and may interoperate with the pusher 134. Also, one end of the first elastic member 135*b* may be connected to the clamp base 135*a* and the other end thereof may be fixed to the side surface of the hand main body 131. In addition, the stopper 135*c* may be disposed at one end of the guide 133 and rotate according to the linear motion of the guide 133 to protrude upward from the hand main body 131 or be drawn into the hand main body 131.

For example, as shown in FIG. 7, when the material M is unloaded from the transfer hand 130, that is, when the material M is pressed by the pusher 134, as the pusher 134 moves forward, the clamp base 135*a* moves forward. Here, the restoring force of the first elastic member 135*b* may be added. In addition, as the guide 133 moves forward, the stopper 135*c* rotates forward, and the material M is unloaded from the transfer hand 130 while the pusher 134 continues to press the material M.

In addition, as shown in FIG. 8, when the material M is loaded on the transfer hand 130, that is, when the material M is loaded on the transfer hand 130 and reaches a preset position, as the pusher 134 moves backward, the clamp base 135*a* moves backward. Accordingly, the first elastic member 135*b* extends while one end of the first elastic member 135*b* moves backward, and as the guide 133 moves backward, the stopper 135*c* rotates and protrudes from the upper portion of the hand main body 131. Accordingly, the stopper 135*c* may prevent the loaded material M from being separated from the transfer hand 130.

The inside clamp 136 may be disposed on the side surface of the hand main body 131. The inside clamp 136 may be connected to the guide 133 and may interoperate with the guide 133 to fix the position of the material M. For example, when the material M is loaded on the hand main body 131, if the guide 133 moves backward and reaches a preset position, the inside clamp 136 may protrude outward from the hand main body 131 and fix the material M. At this time, the inside clamp 136 may be disposed between the hand main body 131 and the inner surface of the material M, and may press the inner surface of the material M to fix the position of the material M.

When the pusher 134 moves forward again and reaches a preset position to unload the material M, the inside clamp 136 is drawn into the hand main body 131. Accordingly, the material M moves freely, and unloading is completed while the pusher 134 presses the material M.

In an embodiment, a plurality of inside clamps 136 may be disposed. For example, two inside clamps 136 may be one each disposed on both side surfaces of the hand main body 131. However, the number of inside clamps 136 is not particularly limited, and may be one or more.

In an embodiment, the inside clamp 136 may include a follower 136*a*, a clamp inclined surface 136*b*, a clamp pad 136*c*, and a second elastic member 136*d*.

The follower 136*a* may be connected to one side of the guide 133. For example, as shown in FIG. 9, the follower 136*a* may be connected to the end of the guide 133 in a rod shape and may move while contacting the clamp inclined surface 136*b* according to the movement of the guide 133. To this end, a part of the follower 136*a* contacting the clamp inclined surface 136*b* may be formed as a roller.

The clamp inclined surface 136*b* is disposed on one side of the hand main body 131, for example, on the side surface. The clamp inclined surface 136*b* may extend in the longitudinal direction of the hand main body 131, and a part thereof may be bent outward. Accordingly, a concave portion 136*f* may be formed in a portion where the clamp inclined surface 136*b* is bent outward, and the follower 136*a* may move along the inner surface of the clamp inclined surface 136*b* so that the clamp pad 136*c* may protrude outward or be drawn inward.

The clamp pad 136*c* is disposed outside the clamp inclined surface 136*b*. The clamp pad 136*c* may include a seating groove 136*e* inserted into the clamp inclined surface 136*b* and corresponding to a portion in which the clamp inclined surface 136*b* is bent outward. Accordingly, as shown in FIG. 9, when the follower 136*a* is located in the concave portion 136*f* of the clamp inclined surface 136*b* according to the movement of the guide 133, a gap is formed between the clamp inclined surface 136*b* and the seating groove 136*e* and the clamp pad 136*c* protrudes outward. As shown in FIG. 10, when the follower 136*a* moves inward from the concave portion 136*f* of the clamp inclined surface 136*b*, since the guide portion 133 and the follower 136*a* have constant positions in the width direction of the transfer hand 130, the clamp inclined surface 136*b* is inserted into the seating groove 136*e* while being pressed outward in the width direction of the transfer hand 130. Accordingly, the clamp inclined surface 136*b* presses the clamp pad 136*c* and a clamping operation proceeds.

The second elastic member 136*d* may be disposed between the clamp inclined surface 136*b* and the clamp pad 136*c*. For example, as shown in FIG. 9, one or more second elastic members 136*d* may be each disposed at the end of the clamp inclined surface 136*b* in the longitudinal direction, one end thereof may be connected to the outer surface of the clamp inclined surface 136*b*, and the other end thereof may be connected to the inner surface of the clamp pad 136*c*.

In an embodiment, when the follower 136*a* is disposed in the concave portion 136*f* of the clamp inclined surface 136*b*, the second elastic member 136*d* may not be compressed, and when the follower 136*a* is separated from the concave portion 136*f* of the clamp inclined surface 136*b*, as the clamp inclined surface 136*b* moves toward the clamp pad 136*c*, the second elastic member 136*d* may be compressed. Then, when the follower 136*a* enters the concave portion 136*f* again, the clamp inclined surface 136*b* moves toward the transfer hand 130 by the restoring force of the compressed second elastic member 136*d*, and the clamp pad 136*c* is drawn inward.

The guide roller 137 is disposed on one side of the hand main body 131 to guide the movement of the material M. For example, as shown in FIGS. 5 to 8, the guide roller 137 may be disposed on the upper surface of the hand main body 131 and may contact the inner surface of the material M. The material M delivered from the counterpart device C to the transfer hand 130 may slide to the inside of the transfer hand 130 along the guide roller 137.

In the drawings, the guide rollers 137 are arranged in a line on the upper surface of the hand main body 131 but are not limited thereto. The guide rollers 137 may be arranged in a plurality of rows on the outside of the hand main body 131 so as to contact the inner surface of the material M and slide the material M.

The hand sensor 138 detects the operations and positions of the transfer hand 130 and the material M during the operation of the transfer hand 130. For example, the hand sensor 138 may detect the positions of the pusher 134 and the material M and transmit the positions to the controller 180.

In an embodiment, the hand sensor 138 may include a first pusher detection sensor 138*a*, a second pusher detection sensor 138*b*, a third pusher detection sensor 138*c*, and a fourth pusher detection sensor 138*d*.

As shown in FIGS. 7 and 8, the first pusher detection sensor 138*a* and the second pusher detection sensor 138*b* may be disposed at the rear of the transfer hand 130 to detect the position of the pusher 134. The first pusher detection sensor 138*a* and the second pusher detection sensor 138*b* may be disposed side-by-side on the side surface of the hand main body 131 in the longitudinal direction.

In an embodiment, before the material M is loaded, the rear end portion of the pusher 134, that is, a detection end portion, may be located at the first pusher detection sensor 138*a*. Thereafter, as the material M is loaded, the pusher 134 moves backward, and when the detection end portion reaches the second pusher detection sensor 138*b*, the second pusher detection sensor 138*b* detects the position of the pusher 134, and the hand driving motor 132 stops operating.

The third pusher detection sensor 138*c* and the fourth pusher detection sensor 138*d* may be disposed on the side surface of the transfer hand 130, for example, on the right side. When the pusher 134 moves forward to unload the material M, the third pusher detection sensor 138*c* and the fourth pusher detection sensor 138*d* detect the position of the front end where the pusher 134 is in contact with the material M.

The third pusher detection sensor 138*c* corresponds to a position when the front end of the pusher 134 moves forward to unload the material M. The fourth pusher detection sensor 138*d* is disposed in front of the third pusher detection sensor 138*c* in the longitudinal direction, and when the fourth pusher detection sensor 138*d* detects the front end of the pusher 134, the hand driving motor 132 stops operating.

In an embodiment, the hand sensor 138 may include a first material detection sensor 138*e*, a second material detection sensor 138*f*, and a third material detection sensor 138*g*.

The first material detection sensor 138*e* is disposed on one side of the front end of the hand main body 131, and may be disposed, for example, on the left side of the hand main body 131. In an embodiment, when the transfer hand 130 passes the material M to the counterpart device C, the material M slides as the pusher 134 moves and presses the material M. When the first material detection sensor 138*e* detects the material M, more specifically, when the first material detection sensor 138*e* detects the inner end of the material M when viewed from the side, it is determined that an unloading operation is completed.

The second material detection sensor 138*f* is disposed at the rear of the first material detection sensor 138*e*. In an embodiment, the material M is loaded from the counterpart device C to the transfer hand 130 and slides inward. When the second material detection sensor 138*f* detects the material M, more specifically, when the second material detection sensor 138*f* detects the outer end of the material M when viewed from the side, it is determined that a loading operation is completed.

The third material detection sensor 138*g* may be disposed at the rear of the second material detection sensor 138*f* and may be disposed adjacent to, for example, the inside clamp 136. In an embodiment, the material M is loaded from the counterpart device C to the transfer hand 130 and slides inward. When the third material detection sensor 138*g* detects the material M, more specifically, when the third material detection sensor 138*g* detects the inner end of the material M when viewed from the side, it is determined that the loading operation is completed.

In an embodiment, when both the second material detection sensor 138*f* and the third material detection sensor 138*g* detect the material M, it may be determined that the loading operation is completed. For example, as the material M slides, the second material detection sensor 138*f* may detect the outer end of the material M and when the third material detection sensor 138*g* detects the inner end of the material M, the hand driving motor 132 may stop operating.

The tilting motor 139 may be disposed on one side of the hand main body 131 and may adjust the inclination of the hand main body 131. For example, as shown in FIGS. 5 and 6, the tilting motor 139 may be disposed at the rear of the hand main body 131 and may be connected to the hand main body 131 through a connection plate 139*a* described below. In an embodiment, the tilting motor 139 may revolve the hand main body 131 in the vertical direction.

In an embodiment, the tilting motor 139 may include the connection plate 139*a*, a tilting driving motor 139*b*, a linear moving member 139*c*, a positioning sensor 139*d*, a tilting slider 139*e*, and a rotation shaft 139*f*.

The connection plate 139*a* is a component that connects the tilting motor 139 to the hand main body 131 and may be disposed on the side surface of the hand main body 131. As the tilting driving motor 139*b* operates, the connection plate 139*a* tilts and the hand main body 131 tilts as well. In an embodiment, the connection plate 139*a* may be tilted with respect to the rotation axis 139*f*.

The linear moving member 139*c* is connected to the tilting driving motor 139*b* and converts the rotational motion of the tilting driving motor 139*b* into linear motion. For example, the linear moving member 139*c* is a ball screw disposed on one side of the tilting driving motor 139*b* and moves up and down as the tilting driving motor 139*b* rotates. The linear moving member 139*c* may be connected to the tilting slider 139*e*, and the tilting slider 139*e* may slide as the linear moving member 139*c* moves, and the connection plate 139*a* may tilt with respect to the rotation axis 139*f*.

The positioning sensor 139*d* detects the position of the tilting motor 139 in real time. For example, the positioning sensor 139*d* may set upper and lower limits of the height of the linear moving member 139*c* or check the position of the tilting slider 139*e*.

One or more tilting sliders 139*e* are disposed on one side of the connection plate 139*a*. For example, as shown in FIG. 11, the tilting sliders 139*e* may be disposed on one side and the other side of the connection plate 139*a*, and one of the tilting sliders 139*e* may be connected to the linear moving member 139*c*. When the linear moving member 139*c* lifts according to the operation of the tilting driving motor 139*b*, the connecting portion 139*g* of the linear moving member 139*c* and the tilting slider 139*e* lifts together, and the tilting slider 139*e* connected thereto moves.

For example, as shown in FIG. 12, the tilting slider 139*e* may include a plurality of sliders movable in horizontal and vertical directions. Accordingly, when the linear movement member 139*c* descends, a vertical movement slider descends and a horizontal movement slider moves to the left. Also, when the linear moving member 139*c* ascends, the vertical movement slider ascends and the horizontal movement slider moves to the left.

More specifically, as shown in FIG. 13, when tilting the hand main body 131 upward, the linear moving member 139*c* descends according to the operation of the tilting driving motor 139*b*. Accordingly, the tilting slider 139*e* connected to the linear moving member 139*c* moves downward and to the left. Also, the other tilting slider 139*e* that is not connected to the linear moving member 139*c* moves up and to the left. Accordingly, the hand main body 131 is tilted upward as the connection plate 139*a* is tilted upward with respect to the rotation shaft 139*f*.

Also, as shown in FIG. 14, when tilting the hand main body 131 downward, the linear moving member 139*c* ascends according to the operation of the tilting driving motor 139*b*. Accordingly, the tilting slider 139*e* connected to the linear moving member 139*c* moves up and to the right. Also, the other tilting slider 139*e* moves downward and to the right. Accordingly, as the connection plate 139*a* is tilted downward with respect to the rotation shaft 139*f*, the hand main body 131 is tilted downward.

In an embodiment, the tilting motor 139 may tilt the hand main body 131 after the material M is loaded. For example, when the material M is loaded on the hand main body 131, the tilting motor 139 may tilt the hand main body 131 upward to prevent the material M from leaning forward while the material transport device 10 moves.

The hand mover 140 is disposed on one side of the main body 120 and moves the transfer hand 130. For example, the hand mover 140 may be disposed inside the main body 120 to move the transfer hand 130 in the vertical direction. The hand mover 140 may be provided in the same number as the transfer hand 130 and may operate independently of each other.

The rail mover 150 may be disposed on one side of the unmanned transport vehicle 110 to move the main body 120 in the left-right direction or the front-back direction.

The navigation 160 may be disposed on the upper surface of the main body 120, detect a signal from the position recognition sensor 20, determine the position of the material transport device 10 in real time, and transmit the position to the server 30, etc.

In addition, the material transport device 10 may include the communication module 170 capable of transmitting/receiving data in real time with the server 30, the counterpart device C, or an external device by wire or wirelessly, the controller 180 controlling the other components of the material transport device 10 according to an embedded program or a user input, the display 190 visualizing the current state of the material transport device 10, the first surrounding detection sensor 200 detecting a surrounding obstacle in the horizontal direction and notifying the server 30 of the surrounding obstacle, the second surrounding detection sensor 210 detecting a surrounding obstacle in the vertical direction and notifying the server 30 of the surrounding obstacle, and the alarm 220 notifying an abnormal operation of the material transport device 10 by sound or light. According to an embodiment, the controller 180 may use a direct circuit structure, such as a memory, a processor, a logic circuit, a look-up table, etc. that may execute the respective control functions through controls of one or more microprocessors or other control apparatuses. According to an embodiment, the controller 180 may be specifically embodied by a module, a program, or a part of code, which contains one or more executable instructions for performing specified logic functions, and executed by one or more microprocessors or other control apparatuses. Further, the controller 180 may include or may be implemented by a processor such as a central processing (CPU) that performs the respective functions, a microprocessor, or the like, according to an embodiment. The communication module 170 include any one or any combination of a digital modem, a radio frequency (RF) modem, an antenna circuit, a WiFi chip, and related software and/or firmware.

The operations of the transfer hand 130 and the material transport device 10 according to an embodiment of the present disclosure and a material transport method according thereto are described with reference to FIGS. 1 to 14.

First, in a state where the material M is not loaded on the transfer hand 130, the material transport device 10 may be disposed at a preset position in the work area. Thereafter, the material transport device 10 receives instructions from a preset program or the server 30 and moves to the counterpart device C along the set path to load the material M. Here, the material transport device 10 may receive a signal from the position recognition sensor 20 through the navigation 160 and determine the current position in real time. When the material transport device 10 deviates from a preset path, the user may determine the position through the server 30 and reset the position of the material transport device 10.

When the material transport device 10 arrives at a preset position, the transfer hand 130 recognizes a marker (not shown) disposed at the front end of the counterpart device C through a positioning sensor (not shown). Through this, the material transport device 10 may determine whether the transfer hand 130 is aligned with the counterpart device C and maintains a sufficiently close distance. When the position of the transfer hand 130 is not aligned, the material transport device 10 may adjust the position of the transfer hand 130. For example, the position of the transfer hand 130 may be adjusted by moving the unmanned transport vehicle 110 or by tilting by the tilting motor 139. Alternatively, the hand mover 140 may adjust the position of the transfer hand 130 in the vertical direction.

When the positions of the transfer hand 130 and the counterpart device C are aligned, the material transport device 10 delivers this to the server 30 or the counterpart device C. Then, in order to perform a material loading operation, the counterpart device C pushes the material M toward the transfer hand 130.

In the operation of loading the material M, the transfer hand 130 may operate the hand driving motor 132 and move the pusher 134 backward, thereby maintaining the position of the material M with the clamp and loading the material M. For example, when the material M is delivered to the transfer hand 130 and the hand sensor 138 disposed at the front end of the transfer hand 130 detects the material M, the hand driving motor 132 operates. Accordingly, the guide 133 moves, and the pusher 134 moves backward. More specifically, when the second material detection sensor 138*f* and/or the third material detection sensor 138*g* of the hand sensor 138 detects the material M, the hand driving motor 132 may operate and move the pusher 134 backward. When both the second material detection sensor 138*f* and the third material detection sensor 138*g* detect the material M, the hand driving motor 132 may operate.

When the guide 133 and the pusher 134 move backward, the front clamp 135 connected to the front end of the guide 133 operates. As the guide 133 moves backward, the front clamp 135 may rotate upward, and accordingly, the material M loaded on the hand main body 131 may not be separated from the hand main body 131 by the front clamp 135.

Also, when the guide 133 and the pusher 134 move backward, the inside clamp 136 connected to one side of the guide 133 operates. When the guide 133 moves backward, the follower 136*a* connected to one side of the guide 133 moves along the clamp inclined surface 136*b* and presses the clamp inclined surface 136*b* toward the clamp pad 136*c*. Accordingly, the clamp pad 136*c* may protrude outward from the hand main body 131 to press the material M, thereby fixing the position of the material M.

The position of the pusher 134 may be controlled by the hand sensor 138. For example, when the first pusher detection sensor 138*a* and/or the second pusher detection sensor 138*b* of the hand sensor 138 detects the detection end portion that is the rear end of the pusher 134, the operation of the hand driving motor 132 may be stopped. For example, the second pusher detection sensor 138*b* may be disposed behind the first pusher detection sensor 138*a*, and, when the second pusher detection sensor 138*b* detects the pusher 134, the operation of the hand driving motor 132 may be stopped. That is, the second pusher detection sensor 138*b* may set a limit for the pusher 134 to move backward.

In an embodiment, each of the front clamp 135 and the inside clamp 136 may include a sensor (not shown). When the material M is loaded, if the front clamp 135 rotates upward and the inside clamp 136 protrudes outward, the sensor may detect and deliver this to the material transport device 10, more specifically, the controller 180.

For example, the sensor may detect a rotational motion of the front clamp 135 and detect whether the front clamp 135 has rotated upward. In addition, the sensor may measure the pressure between the inside clamp 136 and the material M, and detect whether the inside clamp 136 protrudes and presses the material M.

When the sensor detects a clamping operation, the material transport device 10 or the server 30 determines that the loading operation has been completed.

In an embodiment, the tilting motor 139 may tilt the transfer hand 130 after the loading operation is completed. For example, the tilting motor 139 may tilt the transfer hand 130 upward after the loading operation is completed. This may prevent the material M from leaning forward with respect to the transfer hand 130 while the material transport device 10 is moving in a state where the material M is loaded.

In an embodiment, when the material M is loaded on any one transfer hand 130, the material transport device 10 may move to load the material M on the other transfer hand 130. In another embodiment, when a material M is loaded on any one transfer hand 130, the material transport device 10 may move to unload the loaded material M from the other counterpart device C.

Then, the material transport device 10 may move to load the loaded material M on the other counterpart device C. When the material transport device 10 reaches a certain position, similarly, the material transport device 10 determines the position of the transfer hand 130 with the counterpart device C, and aligns the position of the transfer hand 130. When the alignment is completed, an unloading operation is performed.

In the unloading operation, the hand driving motor 132 operates to move the pusher 134 forward so that the material M is pressed and unloaded from the counterpart device C. For example, when the hand driving motor 132 operates, the guide 133 and the pusher 134 move forward, and accordingly, the clamping operation of the front clamp 135 and the inside clamp 136 is released. That is, the front clamp 135 is drawn into the hand main body 131 while rotating forward again. In addition, as the follower **136*a* is drawn into a groove of the clamp inclined surface 136*b*, the clamping pad 136*c* is drawn into the hand main body 131 by the restoring force of the second elastic member 136*d*. Accordingly, the material M is movable, and as the pusher 134** presses the material M, the material M moves forward.

The pusher 134 may move to a preset position, for example, the third pusher detection sensor **138*c* of the hand sensor 138. As the pusher 134 moves, the material M moves from the transfer hand 130 to the counterpart device C. When the first material detection sensor 138*e* of the hand sensor 138 detects the material M, more specifically, when detecting the inner end of the material M, the material transport device 10** determines that the unloading operation is completed.

The material transport device 10 may deliver this to the server 30 and return to the original position.

According to the present disclosure, the operations of the guide 133, the pusher 134, and the clamp may all be performed by the operation of one driving, more specifically, the hand driving motor 132. That is, both the operation of loading and unloading the material M and the operation of fixing the position of the material M with the clamp may be performed by operating the hand driving motor 132.

According to the present disclosure, the material M may be transported accurately and safely through the interoperation of the clamp and the hand sensor 138.

As described above, the present disclosure has been described with reference to the embodiment illustrated in the drawings, but this is merely an example. Those of ordinary skill in the art will fully understand that various modifications and other equivalent embodiments may be made from the embodiments. Therefore, the scope of the protection of the technology of the present disclosure should be determined by the appended claims.

Specific technical descriptions in the embodiments are embodiments and do not limit the technical scope of the embodiments. In order to concisely and clearly describe the present disclosure, descriptions of general techniques and configurations of the related art may be omitted. Also, connections or connection members of lines between elements illustrated in the drawings are examples of functional connections and/or physical or circuit connections, and may be represented by various alternative or additional functional connections, physical connections, or circuit connections in an actual device. In addition, unless specifically stated as "essential" or "importantly", an element may not be a necessary element for the application of the present disclosure.

The term "above" or similar referring expressions used in the description and claims of the present disclosure may refer to both the singular and plural expressions unless otherwise specified. Also, when a range is described in the embodiments, it means that embodiments to which individual values belonging to the range are applied are also included (unless otherwise stated), it is the same as each individual value constituting the range is described in the detailed description of the present disclosure. Moreover, operations constituting the method according to the embodiments may be performed in an appropriate order, if the order is explicitly stated or unless otherwise stated. The embodiments are not necessarily limited according to the order of the description of the steps or operations. All examples or illustrative terms (e.g., etc.) in the embodiments are merely used to describe the embodiments in detail, and the scope of the embodiments is limited by the examples or illustrative terms unless limited by the claims. In addition, those of ordinary skill in the art will appreciate that various modifications, combinations, and changes may be made in accordance with design conditions and factors within the scope of the appended claims or equivalents thereof.

INDUSTRIAL APPLICABILITY

The present disclosure may be applicable to an industry relating to a material transport hand, a material transport device, and a material transport method.

The invention claimed is:

1. A transfer hand for receiving a material from a counterpart device or delivering the material to the counterpart device, the transfer hand comprising:

a hand main body having a rod-like shape configured to be inserted through a central hole of the material having an annular shape, wherein an outer surface of the hand main body faces an inner surface of the material in a state where the hand main body is inserted through the central hole of the material, a hand driving motor disposed on one side of the hand main body, a guide configured to move according to the hand driving motor, a pusher disposed on one side of the guide and configured to press the material, and a clamp disposed on the other side of the hand main body and configured to maintain a position of the material, wherein, when the hand driving motor operates, the guide is configured to move, and the pusher and the clamp are configured to interoperate.

2. The transfer hand of claim 1, wherein, when the guide moves forward, the pusher is configured to move forward and press the material loaded on the hand main body and unloads the material, and wherein, when the guide moves backward, the pusher is configured to move backward and form a space in which the material is loaded from the counterpart device.

3. The transfer hand of claim 1, wherein the clamp comprises a front clamp disposed at a front end of the hand main body, configured to protrude outward from the hand main body when the pusher moves backward, and configured to be drawn into the hand main body when the pusher moves forward.

4. The transfer hand of claim 3, wherein the clamp further comprises a clamp base disposed on one side of the hand main body, a first elastic member connected to the clamp base, and a stopper connected to the guide, wherein, when the material is loaded, as the pusher moves backward, the clamp base is configured to moves and the first elastic member is configured to extend so that the stopper rotates in one direction and protrudes upward from the hand main body, and wherein, when the material is unloaded, as the pusher moves forward, the clamp base is configured to move, and the first elastic member is configured to be restored so that the stopper is drawn into the hand main body.

5. The transfer hand of claim 1, wherein the clamp comprises one or more inside clamps disposed on a side surface of the hand main body, configured to protrude from the outer surface of the hand main body when the guide moves backward, and configured to be drawn into an inner surface of the hand main body when the guide moves forward.

6. The transfer hand of claim 5, wherein the one or more inside clamps comprise a follower connected to the guide, a clamp inclined surface in contact with the follower, a clamp pad disposed outside the hand main body, and one or more second elastic members disposed between the clamp inclined surface and the clamp pad, wherein, when the material is loaded, as the guide moves backward, the follower is configured to be drawn along the clamp inclined surface and press the one or more second elastic members so that the clamp pad protrudes outward from the hand main body, and wherein, when the material is unloaded, as the guide moves forward, the follower is configured to be drawn along the clamp inclined surface, and the one or more second elastic members are configured to be restored so that the clamp pad is drawn into the hand main body.

7. The transfer hand of claim 1, further comprising one or more rollers disposed outside the hand main body, and configured to contact an inner surface of the material and guide a movement of the material.

8. The transfer hand of claim 1, further comprising a tilting motor disposed on one side of the hand main body, and configured to adjust an inclination of the hand main body.

9. The transfer hand of claim 8, wherein the tilting motor comprises a tilting driving motor configured to operate independently of the hand driving motor and one or more tilting mechanisms interoperating with the tilting motor, wherein, when the material is loaded, the tilting driving motor is configured to operate to rotate the hand main body upward, and wherein, when the material is unloaded, the tilting driving motor is configured to operate to rotate the hand main body downward.

10. The transfer hand of claim 1, further comprising a hand sensor comprising a plurality of sensors disposed inside and outside of the hand main body in a longitudinal direction, wherein the hand sensor is configured to determine that an unloading operation is completed if one of the plurality of sensors disposed outside detects the material when the material is unloaded, and determine that a loading operation is completed if one of the plurality of sensors disposed outside detects the material delivered from the counterpart device when the material is loaded.

11. A material transport method of receiving a material from a counterpart device or delivering the material to the counterpart device using a transfer hand including a hand main body that has a rod-like shape, the material transport method comprising:

loading the material by operating a hand driving motor, inserting the hand main body through a central hole of the material, moving a pusher backward, and maintaining a position of the material with a clamp, by the transfer hand; and unloading the material from the counterpart device by moving the pusher and pressing the material, by the hand driving motor, wherein an outer surface of the hand main body faces an inner surface of the material in a state where the hand main body is inserted through the central hole of the material.

12. The material transport method of claim 11, wherein the loading of the material includes rotating a front clamp disposed at a front end upward as the pusher moves backward, and wherein the unloading of the material comprises drawing the front clamp inward as the pusher moves forward.

13. The material transport method of claim 11, wherein the loading of the material includes pressing the material by protruding an inside clamp disposed on a side surface outward as the pusher moves backward, and wherein the unloading of the material comprises drawing the inside clamp inward as the pusher moves forward.

14. The material transport method of claim 11, wherein a movement of the pusher and an operation of the clamp are performed simultaneously.

15. The material transport method of claim 11, wherein the loading of the material comprises moving the pusher backward when one or more sensors disposed in front of a hand sensor detect the material, and wherein the unloading of the material comprises determining that the unloading is completed when one or more sensors disposed in a rear of the hand sensor detect the material as the pusher presses the material.

16. The material transport method of claim 11, further comprising:

before the loading of the material, determining, by the transfer hand, a position of the counterpart device; and calibrating, by a tilting motor, a tilting angle of the transfer hand based on the determined position.

17. The material transport method of claim 11, further comprising tilting the transfer hand upward by a certain angle by a tilting motor after the loading of the material.

18. A material transport device comprising a transfer hand for receiving a material from a counterpart device or delivering the material to the counterpart device, wherein the transfer hand comprises a hand main body having a rod-like shape configured to be inserted through a central hole of the material, a hand driving motor disposed on one side of the hand main body, a guide configured to move according to the hand driving motor, a pusher disposed on one side of the guide and configured to press the material, and a clamp disposed on the other side of the hand main body and configured to maintain a position of the material, wherein, when the pusher moves forward, the clamp is configured to be released and the pusher presses the material loaded on the hand main body so that the material is unloaded, wherein, when the pusher moves backward, the pusher is configured to form a space in which the material is loaded from the counterpart device, and the clamp is configured to maintain a position of the material, and wherein an outer surface of the hand main body faces an inner surface of the material in a state where the hand main body is inserted through the central hole of the material.

19. The material transport device of claim 18, wherein the clamp comprises:

a front clamp disposed at a front end of the hand main body, configured to rotate according to an operation of the pusher, and prevent the material from being separated from the hand main body; and an inside clamp disposed on a side surface of the hand main body, and configured to protrude outward or drawn inward according to the operation of the pusher, and fix the position of the material.

20. The material transport device of claim 19, further comprising a hand sensor comprising a plurality of sensors of the hand main body disposed in a longitudinal direction, wherein, when the material is loaded on the counterpart device, if the hand sensor detects the material, the pusher is configured to move backward, the front clamp is configured to rotate upward, and the inside clamp is configured to press the inner surface of the material, and when the material is unloaded from the counterpart device, as the pusher moves forward, the front clamp is configured to rotate downward and the inside clamp is configured to be drawn into the hand main body.

* * * * *